United States Patent [19]

Albe-Fessart et al.

[11] 3,857,961

[45] Dec. 31, 1974

[54] METHOD FOR PRODUCING FOIE GRAS BY INDUCTION OF HYPERPHAGIA IN GEESE

[76] Inventors: Denise Albe-Fessart, 51 rue Molitor, Paris; Pierre Auffray, 4 rue Suzanne Masson 78, Saint-Cyr l'Ecole; Francois Gallouin, 36 rue Clement Perrot, Vitry-sur-Seine, all of France

[22] Filed: July 20, 1972

[21] Appl. No.: 273,671

[30] Foreign Application Priority Data
July 21, 1971 France .............................. 71.26768

[52] U.S. Cl. .................................................. 426/2
[51] Int. Cl. ............................................ A22c 21/00
[58] Field of Search........... 99/2 G, 2 N, 2 ND, 107; 426/2

[56] References Cited
OTHER PUBLICATIONS

Ives, "Domestic Geese and Ducks," 1947, Published by Orange Judd Publishing Company, Inc., pages 121–129, inclusive.

*Primary Examiner*—Hyman Lord
*Attorney, Agent, or Firm*—Burgess, Dinklage & Sprung

[57] ABSTRACT

A method for producing foie gras by induction of hyperphagia in animals, particularly in geese.

The application of anti-catecholamine substances for the induction of hyperphagia in animals.

It comprises the administration of an effective amount of an anti-catecholamine substance in the cerebrospinal fluid of the animal.

The application of anti-catecholamine substances according to the invention notably permits the induction of an hepatic hypersteatosis in animals.

10 Claims, No Drawings

METHOD FOR PRODUCING FOIE GRAS BY INDUCTION OF HYPERPHAGIA IN GEESE

This invention relates to hyperphagia induced for the cramming of animals.

A particularly advantageous field of application of the invention is that of the manufacture of so-called "foie gras," that is to say, the livers of crammed animals, and notably geese.

In mammals, two hypothalamic structures are involved in the regulation of the ingestion of food; they are the lateral area known as the "hunger center" and the ventromedial nucleus deemed as being the "satiety center".

Thus, aphagia (see S. E. FELDMAN, S. LARSSON, M. K. DIMICK and S. LEPKOVSKY, Aphagia in chickens— Am. J. Physiol; 191; 1957, pp.259–261 and C. J. SMITH— The effect of lateral hypothalamic lesions on food intake of chickens— Poultry Sc. 46, 1967, p.1320), and hyperphagia (see S. LEPKOVSKY, Body composition of male chickens, Poultry Sc. 45, 1966, pp.582–588) have already been observed in the chicken following hypothalamic lesions.

It has also been demonstrated that destruction of the ventromedial complex of the hypothalamus in geese resulted in significant hyperphagia in the animal treated (P. AUFFRAY and J. C. BLUM — Hyperphagia and hepatic steatosis in the goose after lesion of the ventromedial nucleus of the hypothalamus C.R. Acad. Sc. PARIS T 270., 1970, p.2,362–2,365). Obesity and hypertrophic hepatic steatosis is the corollary of this "self cramming".

However, although it is economically very advantageous to obtain induced hyperphagia, and particularly such a hypertrophic hepatic steatosis, the destruction of the hypothalamic ventromedial complex of the animals to be treated is very difficult to carry out industrially on farms, owing to the very delicate procedure called for farms, owing to the very delicate procedure called for.

These and other objects and advantages are realized in accordance with the present invention by injecting, animals with or administering by any other suitable way, a predetermined amount of an anti-catecholamine substance into the cerebrospinal fluid of said animals. This serves to induce hepatic hypersteatosis.

The substances known by the name of anticholamine substances are compounds which withstand the formation of catecholamines, sympathomimetic amines derived from catechol or limiting this formation. The catecholamines include products such as adrenaline, noradrenaline and dopamine.

By way of example, hydroxy-6-dopamine or 6-OH DOPA may be mentioned, among others, as being suited to be used according to the invention.

A particularly suitable method for administering the said anticatecholamine substance into the cerebrospinal fluid of the animal consists in an injection into the said fluid, preferably with a previously anesthetized animal; but any other mode of administration known to a man skilled in the art for supplying the said active substance into the cerebrospinal fluid may be used.

Advantageously, the injection of an anticatecholamine substance is effected into the third ventricle or in the region of the hypothalamic ventromedial nucleus of the animal.

While the following theoretical interpretation can in no way be considered as limiting the scope of the invention, it is thought that the injection of an anticatecholamine substance into the brain, or intraventricular administration thereof, results in a notable and durable reduction of the noradrenaline and dopamine contents of the brain. Furthermore, injection by the systemic way appears to have no effect, which confirms that the product administered does not pass the hematoencephalic barrier.

The hyperphagia obtained according to the invention is absolutely comparable, and most often superior, to that provided by the destruction of the hypothalamic ventromedial complex of the animal and, apart from the advantages mentioned hereinabove, can be obtained after only one administration or one injection of an anti-catecholamine substance according to the invention.

The most suitable amounts of anti-catecholamine substances to be administered according to the invention can easily be determined by routine tests. The minimum dose is obviously not critical. Only the maximum dose has to be determined as being the upper limit beyond which notable disorders are observed in the animal.

As a non-limiting example, the optimal amount of 6-OH DOPA to be administered by intraventricular injection is about 250 $\mu$g in the case of the goose to provide the hyperphagia induced according to the invention. In this case the maximal dose is about 300 $\mu$g.

In the case of administration by injection into the hypothalamic ventromedial complex of the goose, the rate of 6-OH DOPA used is advantageously in the range of 30 to 150 $\mu$g, preferably from 45 to 100 $\mu$g.

A particularly advantageous industrial result obtained by the method of the invention is the production of goose "foie gras."

The following examples illustrate the invention without limiting its scope.

The geese treated according to the invention are geese of the "Landaise" breed, genetically suited for the production of "foie gras."

EXAMPLE 1

"Landaise" breed geese were anesthetized by a continuous intravenous perfusion of a 1/50 solution of "Pentothal" in distilled water. The head of the animal was placed in a stereotaxis apparatus derived from the Horsley and Clarke apparatus, and the goose was maintained by the acoustic duct and the beak.

Hydroxy-6-dopamine was injected into the third ventricle at a rate of 10 microliters in 5 minutes, using a trocart connected to a precision micropump by a catheter.

A single injection was given to each animal.

Control animals were also prepared in the same manner but replacing hydroxy-6-dopamine by physiological saline solution.

Following the aforesaid operation, the animals were placed in individual cages with free access to water and food.

The amount of food taken per animal and per day was measured over a period of 35 days.

The complete, balanced feed supplied consisted of 74% maize, 15% soybean meal, 3% fish meal, mineral salts as oligo-elements and all the necessary vitamins.

The geese were sacrificed, i.e. slaughtered, at the end of the experiment, the livers being thereafter removed and weighed.

A dose of hydroxy-6-dopamine smaller than 150 μg administered by intraventicular injection only produced low levels of hyperphagia which did not last for longer than 10 days.

A dose of about 250 μg per animal was observed to be particularly advantageous. In this case, food intake was double and even three times that of the control animals.

The weight of the livers taken from the animals 35 days after the injection varied from 350g to 900g (average 580g) depending on the animal.

The weight of the livers of the control animals, on the other hand, lies in the range of 80 to 160g (average 130g).

A higher dose than 300 μg can cause serious disorders: doses of 500 μg of hydroxy-6-dopamine were injected to 8 geese; 6 geese died and 2 showed very pronounced hyperphagia.

EXAMPLE 2

"Landaise" breed geese were prepared as described in Example 1 and hydroxy-6-dopamine was administered to them by injection into the hypothalamic ventromedial complex.

a. 15μg hydroxy-6-dopamine per animal was administered by injection into each of the ventromedial nuclei. No notable alteration was observed in the amount of feed ingested.

b. 45μg hydroxy-6-dopamine per animal was administered by injection into the hypothalamic ventromedial complex. Substantial hyperphagia was observed in geese so treated.

c. a first injection of 15μg hydroxy-6-dopamine per animal was administered in the hypothalamic ventromedial complex. A few weeks later, a further dose of 45μg hydroxy-6-dopamine was administered in the same manner. The geese then showed significant hyperphagia.

d. three geese were treated according to c), but a second dose of 100 μg, instead of 45 μg, was administered. These geese showed still more significant hyperphagia than those treated according to c).

In this last case, the livers obtained from animals sacrificed 35 days after the last injection weighed from 220 to 550g (average 380g) whereas the livers of control geese subjected to the treatment described in Example 1 only weighed from 80 to 160g (average 130g).

What is claimed is:

1. A method for obtaining foie gras by induction of hyperphagia in geese which comprises the administration of an anti-catecholamine substance into the cerebrospinal fluid of the goose in an amount not more than about 300 μg to induce hyperphagia.

2. A method according to claim 1, wherein said goose is thereafter fed in a conventional manner and the liver is removed from the slaughtered animal.

3. A method according to claim 1, wherein the mode of administration is an injection into the cerebrospinal fluid of a previously anesthetized goose.

4. A method according to claim 3, wherein the mode of administration is an injection into the hypothalamic third ventricle of the goose.

5. A method acording to claim 3, wherein the mode of administration is an injection into the hypothalamic ventromedial nuclei of the goose.

6. A method according to claim 3, wherein said anti-catecholamine substance is hydroxy-6-dopamine.

7. A method according to claim 4, wherein the anti-catecholamine substance is hydroxy-6-dopamine.

8. A method according to claim 7, wherein the injection comprises about 250 μg of hydroxy-6-dopamine per goose.

9. A method according to claim 5, wherein the injection comprises about 30 to 150 μg of hydroxy-6-dopamine.

10. A method according to claim 9, wherein the injection comprises about 45 to 100 μg of hydroxy-6-dopamine.

* * * * *